(12) United States Patent
Pandey et al.

(10) Patent No.: US 9,476,798 B2
(45) Date of Patent: Oct. 25, 2016

(54) ON-LINE MONITORING OF HOT GAS PATH COMPONENTS OF A GAS TURBINE

(71) Applicant: General Electric Company, Schenectady, NY (US)

(72) Inventors: Achalesh Kumar Pandey, Greenville, SC (US); Lucy Summerville Giametta, Greenville, SC (US)

(73) Assignee: General Electric Company, Schenectady, NY (US)

( * ) Notice: Subject to any disclaimer, the term of this patent is extended or adjusted under 35 U.S.C. 154(b) by 147 days.

(21) Appl. No.: 14/186,560

(22) Filed: Feb. 21, 2014

(65) Prior Publication Data

US 2015/0241308 A1 Aug. 27, 2015

(51) Int. Cl.
*G01M 15/14* (2006.01)
*F02C 9/00* (2006.01)

(52) U.S. Cl.
CPC .............. *G01M 15/14* (2013.01); *F02C 9/00* (2013.01); *F05D 2260/80* (2013.01); *F05D 2270/8041* (2013.01)

(58) Field of Classification Search
CPC .......... G01J 2005/0077; G01J 5/0088; F01D 21/003; F01D 21/14; G01N 29/0654; G01M 15/14
USPC ....................................................... 73/112.01
See application file for complete search history.

(56) References Cited

U.S. PATENT DOCUMENTS

| | | | |
|---|---|---|---|
| 6,796,709 B2* | 9/2004 | Choi ..................... | G01J 5/0022 374/102 |
| 7,432,505 B2* | 10/2008 | Brummel .............. | F01D 21/003 250/332 |
| 7,690,840 B2 | 4/2010 | Zombo et al. | |
| 7,925,454 B1* | 4/2011 | Narcus .................. | G01D 21/00 340/679 |
| 8,528,317 B2* | 9/2013 | Gerez .................... | B64D 45/00 244/53 B |
| 8,587,660 B2* | 11/2013 | Mitra ................. | G01N 29/0654 348/158 |
| 8,602,722 B2* | 12/2013 | George ................. | F01D 21/003 415/118 |
| 8,692,887 B2* | 4/2014 | Ringermacher ... | G01B 11/0658 348/128 |
| 8,749,629 B2* | 6/2014 | Baleine ..................... | G01J 5/00 348/135 |
| 8,818,078 B2* | 8/2014 | Telfer .................. | F03D 11/0091 382/149 |
| 2005/0038817 A1 | 2/2005 | Huang et al. | |
| 2009/0255332 A1* | 10/2009 | Bunker ..................... | G01F 1/68 73/204.11 |
| 2011/0211940 A1* | 9/2011 | George ................. | F01D 21/003 415/1 |
| 2012/0026306 A1* | 2/2012 | Mitra ................. | G01N 29/0654 348/61 |
| 2012/0200698 A1* | 8/2012 | Baleine ..................... | G01J 5/00 348/142 |
| 2013/0202192 A1* | 8/2013 | Telfer .................. | F03D 11/0091 382/154 |
| 2014/0176695 A1* | 6/2014 | Giametta ............. | G01N 21/954 348/82 |

* cited by examiner

*Primary Examiner* — Freddie Kirkland, III
(74) *Attorney, Agent, or Firm* — Sutherland Asbill & Brennan LLP

(57) ABSTRACT

Systems and methods for on-line monitoring of hot gas path components of a gas turbine are provided. According to one embodiment of the disclosure, a system may include a camera operable to monitor one or more hot gas path components of the gas turbine and a processor communicatively coupled to the camera. The processor is operable to receive realtime data from the camera monitoring the one or more hot gas path components of the gas turbine and compare the realtime data to reference data. Based on the comparison, the processor can determine that a difference between the realtime data and the reference data exceeds a predetermined threshold. If the difference exceeds the predetermined threshold, the processor can notify operators of an anomaly in the one or more hot gas path components.

20 Claims, 8 Drawing Sheets

ON-LINE MONITORING OF HOT GAS PATH COMPONENTS OF A GAS TURBINE

TECHNICAL FIELD

This disclosure relates generally to monitoring gas turbines, and more particularly, to systems and methods for on-line monitoring of hot gas path components of a gas turbine.

BACKGROUND

Conventional gas turbines operate at relatively high speeds. For operation of a gas turbine, absolute and relative positions of rotating and stationary parts are usually maintained within certain design tolerances. Typically, axial movement of gas turbine buckets may be restricted by a lock wire system and vertical movement may be restricted by a dovetail locking system.

However, if a lock wire moves away from its radial position, it may cause buckets to move in forward or aft axial directions. If this movement exceeds a design limit, it may cause damage to a bucket or other adjacent hardware. Such damage can result in forced outages and expensive repair or replacement of various hot gas path components.

Monitoring the health of hot gas path components can help to assess their condition, identify signs of possible failures, and allow taking appropriate failure preventive measures.

One conventional method used in monitoring axial movements of buckets includes borescope inspections. The borescope inspections enable analyzing internal machine defects and performing certain maintenance before equipment failure occurs. However, such inspections can only be performed when the gas turbine is offline.

Another conventional method includes detecting bearing vibrations that may indicate turbine bucket problems. This method, however, only allows identifying a problem when significant damage has already occurred and, thus, does not prevent damage and associated costs.

BRIEF DESCRIPTION OF THE DISCLOSURE

The disclosure relates to systems and methods for on-line monitoring of hot gas path components of a gas turbine. According to one embodiment of the disclosure, a method for on-line monitoring of hot gas path components of a gas turbine is provided. The method may include receiving, by a processor, realtime data from a camera monitoring one or more hot gas path components of the gas turbine. The realtime data can be compared to reference data. Based at least in part on the comparison, it can be determined that a difference between the realtime data and the reference data exceeds a predetermined threshold. Based at least in part on the determination, a notification of an anomaly in the one or more hot gas path components can be selectively provided.

In another embodiment of the disclosure, a system for on-line monitoring of hot gas path components of a gas turbine can be provided. The system can include a camera operable to monitor one or more hot gas path components of the gas turbine. Additionally, the system can include a processor communicatively coupled to the camera. The processor is operable to receive realtime data from the camera monitoring the one or more hot gas path components of the gas turbine and compare the realtime data to reference data. Based at least in part on the comparison, the processor can determine that a difference between the realtime data and the reference data exceeds a predetermined threshold. Based at least in part on the determination, the processor can selectively notify an operator of an anomaly in the one or more hot gas path components.

In yet another embodiment of the disclosure, another system is provided. The system can include a gas turbine with a plurality of hot gas path components, an infrared (IR) camera operable to monitor the plurality of hot gas path components, and a processor communicatively coupled to the camera. The processor is operable to receive realtime thermal images from the IR camera monitoring the plurality of hot gas path components of the gas turbine. The processor can compare the received realtime thermal images to reference thermal images. Based at least in part on the comparison, the processor can determine that a difference between the realtime thermal images and the reference thermal images exceeds a predetermined threshold. Based at least in part on the determination, the processor can selectively notify of operator an anomaly in the plurality of hot gas path components.

Other embodiments and aspects will become apparent from the following description taken in conjunction with the following drawings.

DETAILED DESCRIPTION

Figure 1:
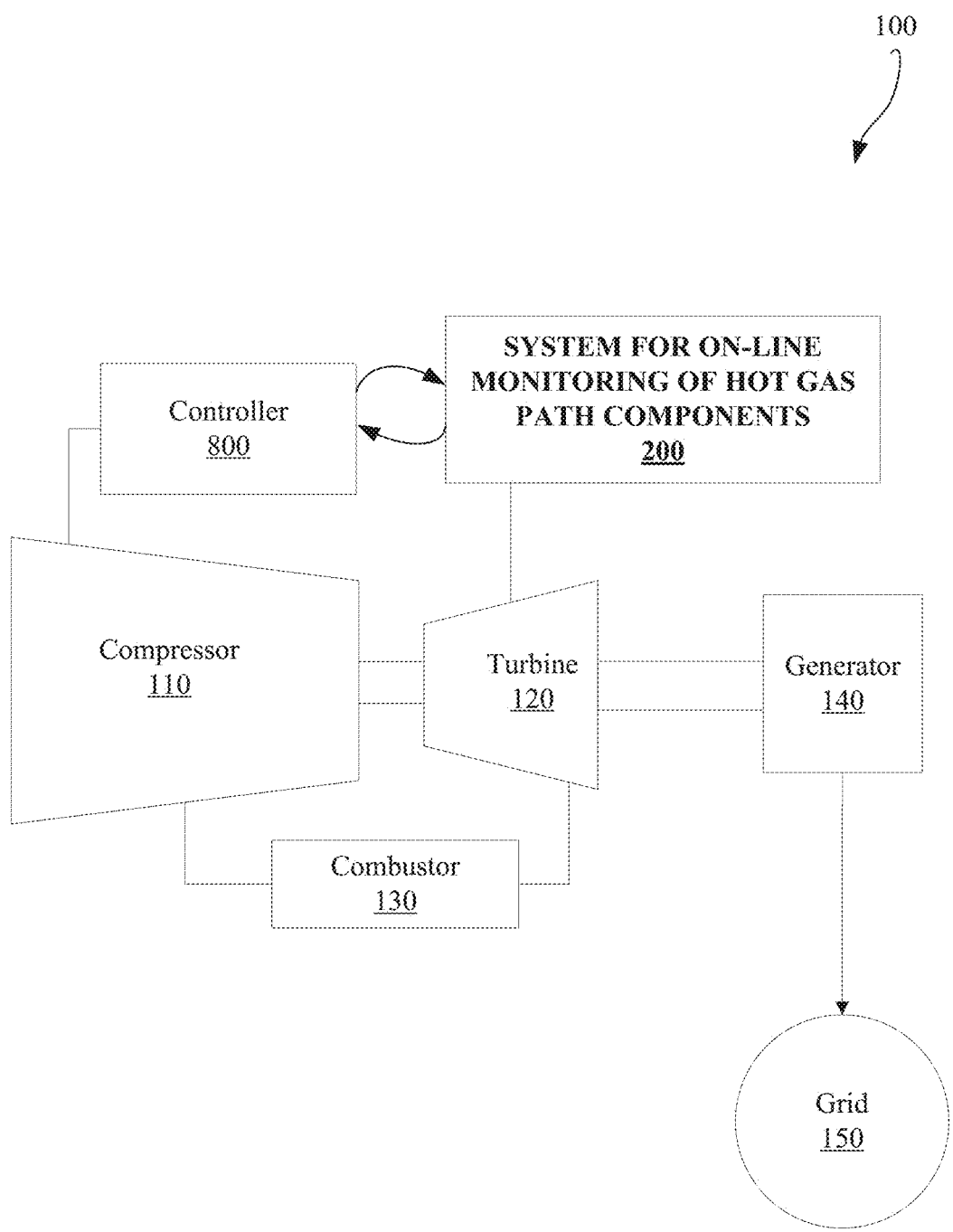
FIG. 1 is a block diagram illustrating an example environment suitable for implementing systems and methods for on-line turbine monitoring of hot gas path components, in accordance with one or more example embodiments of the disclosure.

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

Certain embodiments described herein relate to systems and methods for on-line monitoring of hot gas path components of a gas turbine.

A gas turbine typically includes a compressor, a combustor chamber, and a turbine section. The compressor and combustor can produce pressured gas transmitted to the turbine section where the gas is converted to mechanical energy. The turbine section can include moving parts that encounter hot gases received from the compressor. These moving parts (also referred to as hot gas path components) can be affected by the operating conditions of the gas turbine, for example, high temperatures, high pressures, high-speed rotations, and so forth. As a result, buckets, nozzles, airfoils, blades, and other hot gas path components are subject to failures, such as creep, fatigue, degradation, migration, liberation, shrouding, cracking, and so forth.

Unexpected failures of hot gas path components, such as buckets, can typically result in increased maintenance costs and downtime of a power plant. It may be difficult to monitor the health of hot gas path components and identify possible malfunctions while the turbine is in service. However, on-line monitoring can be implemented through analyzing of video data associated with the turbine.

A camera can be positioned in the turbine to capture data associated with various hot gas path components, such as bucket blades, airfoils, nozzles, and so forth. The data can be captured while the turbine is in operation, thus the monitoring can be continuous or periodical and independent of turbine operation cycles. The data from the camera can be analyzed to identify defects and disposition of the hot gas path components of the turbine at an early stage. The defects or disposition can be identified based on spatial, geometric, or thermal changes of hot gas path components of the turbine. The analysis can include various change detection algorithms, such as reference coordinate changes, measuring distances between turbine parts, image subtractions, relative geometrical change detections between adjacent parts, and so forth.

The detected changes can be evaluated in relation to certain thresholds. When these thresholds are exceeded, various alarms can be generated and provided to the gas turbine operators and/or engineers locally or through a central control. Additionally, the changes can be processed using a decision support system to provide unit operation and maintenance recommendations.

In some embodiments, the system for on-line monitoring of hot gas path components can send a signal to a turbine protective control system to trip the turbine or to perform a graceful shutdown of the system to avoid further damage.

Thus, on-line monitoring of hot gas path components can provide useful information related to the state of the blades, buckets, rotors, nozzles, and airfoils as well as identify potential areas for maintenance. Using this information, failures of hot gas path components can be detected at early stages, and measures can be taken to prevent or otherwise minimize relatively major or catastrophic failures and associated costs.

The technical effects of certain embodiments of the disclosure can include reducing failures and downtime of a gas turbine by monitoring the health of the hot gas path components of the turbine on-line during the turbine operation. Further technical effects of certain embodiments of the disclosure can include reducing power unit downtime by eliminating or otherwise minimizing the need for offline borescope inspections.

The following provides the detailed description of various example embodiments related to the systems and methods for on-line monitoring of hot gas path components of a gas turbine.

Referring now to FIG. 1, a block diagram illustrates an environment 100 suitable for implementing the systems and methods for on-line turbine monitoring of hot gas path components, in accordance with one or more example embodiments.

The system environment 100 may comprise a gas turbine assembly including a compressor 110, a turbine 120 coupled to the compressor 110, and a combustor 130. The turbine 120 may drive a generator 140 that produces electrical power and supplies the electrical power via a breaker to an electrical grid 150. The grid 150 may include various conventional distribution systems.

A system 200 for on-line monitoring of hot gas path components can be coupled to the turbine 120 and/or compressor 110. The system 200 for on-line monitoring of hot gas path components can include a camera installed in the turbine 120. The camera can include a video camera, an IR camera, and so forth. The camera can be equipped with additional components to improve data capture. For example, a video camera can be equipped with a lighting unit or illumination source to improve lighting conditions (e.g., one or more strobes). The camera can be, for example, installed through the outer covering above a stage 1 bucket. In other embodiments, the camera can be installed in other locations of the turbine 120.

The compressor 110, the turbine 120, and the combustor 130 can be coupled to the controller 800, which can manage operations of the gas turbine. The controller 800 can include a computer system having a processor(s) that executes programs to control the operations of the gas turbine using sensor inputs, transfer function outputs, and instructions from human operators.

The controller 800 can interact with the system 200 for on-line monitoring of hot gas path components to provide notifications concerning possible anomalies of a hot gas path component to an operator or another user, initiate a turbine shutdown based on operator instructions, and so forth. In some embodiments, the system 200 may reside in the controller 800. Alternatively, the system 200 can be an independent entity communicatively coupled to the controller 800.

Figure 2:
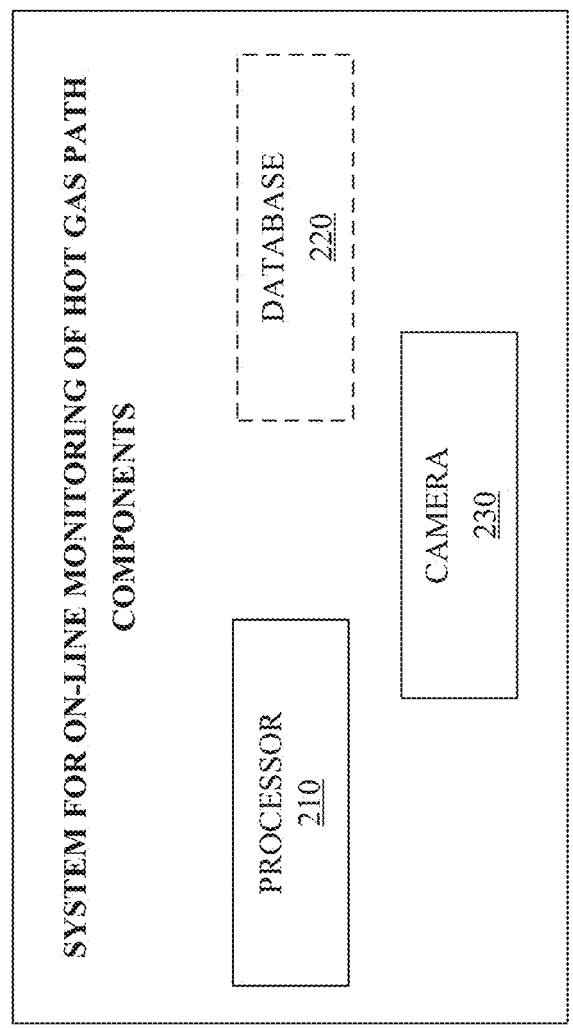
FIG. 2 is a block diagram illustrating various modules of the system for on-line monitoring of hot gas path components, in accordance with one or more example embodiments of the disclosure.

FIG. 2 is a block diagram showing various modules of the system 200 for on-line monitoring of hot gas path components, in accordance with certain embodiments. The system 200 may comprise a processor 210, an optional database 220, and a camera 230. The processor 210 may include a programmable processor, such as a microcontroller, a central processing unit (CPU), and so forth. In other embodiments, the processor 210 may include an application-specific integrated circuit (ASIC) or programmable logic array (PLA), such as a field programmable gate array (FPGA), designed to implement the functions performed by the system 200.

The processor 210 may receive realtime data from the camera 230 monitoring one or more hot gas path components of the gas turbine. The realtime data can be compared to reference data and, based on the comparison, the processor 210 can determine whether a difference between the realtime data and the reference data exceeds a predetermined threshold. If the difference is below the predetermined threshold, no further action is taken. However, if the difference exceeds the predetermined threshold, the processor 210 notifies, for example, an operator of the gas turbine, of an anomaly in the one or more hot gas path components.

The notification can be made by issuing an alert to the operators of the gas turbine, providing a maintenance advisory to the operators of the gas turbine, issuing a signal to a protective system associated with the gas turbine, providing operation recommendations to the operators of the gas turbine, providing a visualization of anomaly trends to the operators of the gas turbine, and so forth. The optional database 220 can store realtime data, historical data, and reference data related to the hot gas path components. The realtime data stored in the database can become historical data at a later time.

The camera 230 can include a video camera, an IR camera, or some other camera. In some example embodiments, the camera 230 includes additional units, such as a lighting unit, an illumination source, and so forth.

Figure 3:
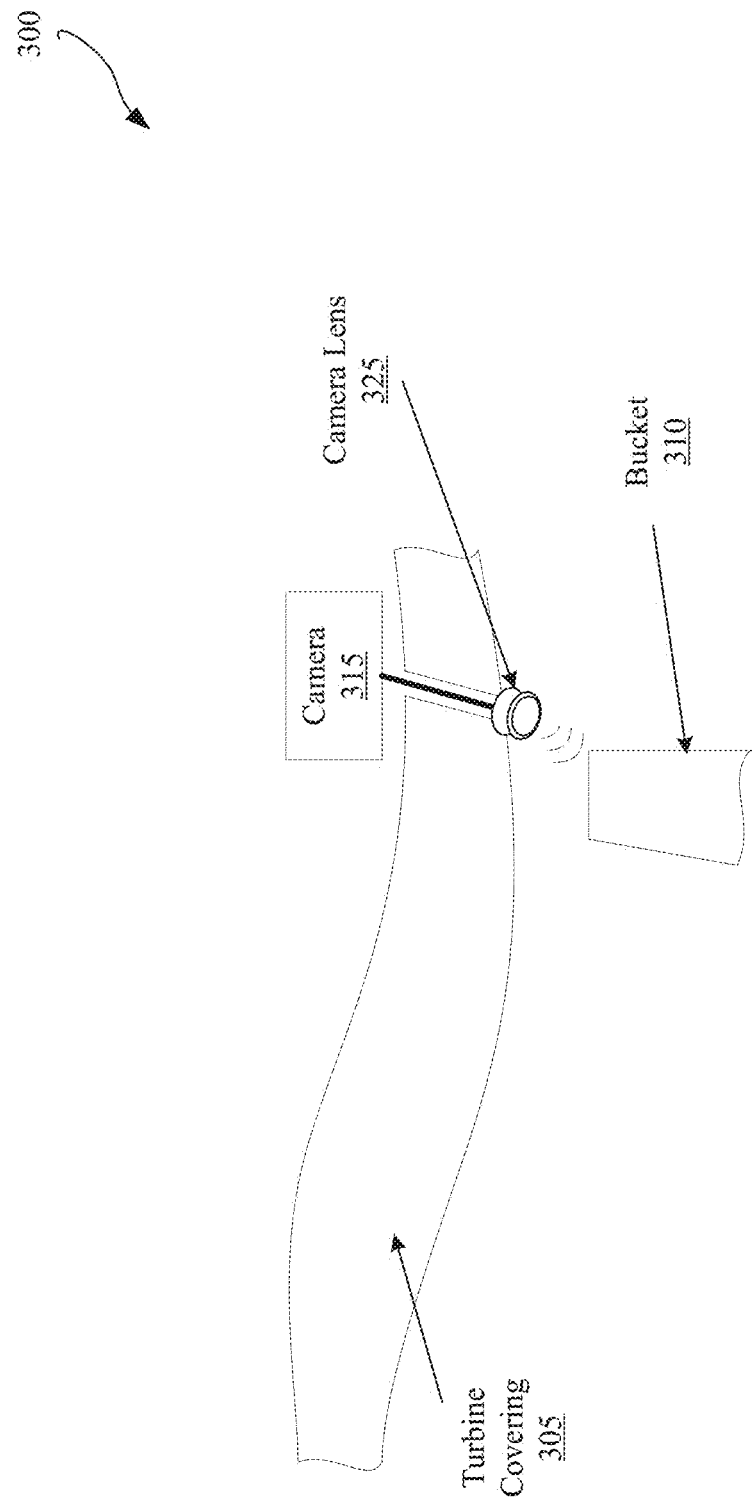
FIG. 3 illustrates example positioning of a camera and associated components in a turbine, in accordance with one or more example embodiments of the disclosure.

FIG. 3 depicts a block diagram 300 illustrating an example positioning of a camera and its components on a turbine and the capturing of data related to the health of hot gas path components, in accordance with an embodiment of the disclosure.

To install a camera 315, a hole can be drilled into a turbine covering 305. Alternatively, existing apertures can be used to install the camera 315 and/or its components. In the hole, fiber optic 320 with a camera lens 325 can be installed. The camera lens 325 can be positioned to monitor a bucket 310 of the turbine or other hot gas path components. The fiber optics 320 can connect the camera lens 325 with the camera 315 to transmit data from the camera lens 325 to the camera 315.

In some embodiments, the camera 315 is an IR camera and can capture the temperature distribution of a surface of one or more hot gas path components (for example, adjacent buckets, a bucket and a nozzle, and so forth). The data received from the IR camera can be used as a thermographic map of the hot gas path components to build 3D maps of the components and so forth. Alternatively, the camera 315 is a video camera which can capture visual data inside the hot gas path.

Figure 4:
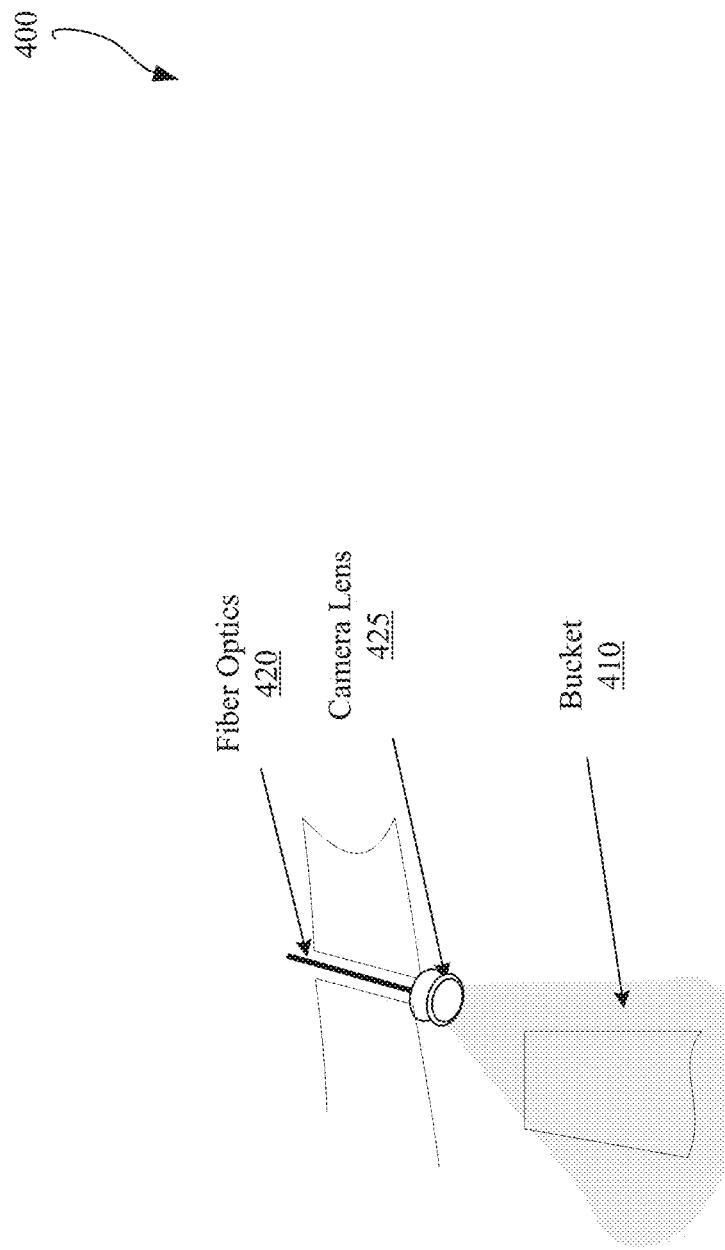
FIG. 4 illustrates example positioning of a camera and associated components in a turbine, in accordance with one or more example embodiments of the disclosure.

FIG. 4 depicts a block diagram 400 illustrating an example positioning of a camera and its components in a turbine and the capturing of data related to the health of hot gas path components, in accordance with an embodiment of the disclosure.

A camera lens 425 of the camera can be disposed in the hot gas path to view at least one component of the hot gas path (for example, a bucket 410, a nozzle, an airfoil, a rotor, and so forth). In some embodiments, the camera lens 425 is disposed so that the data captured by the lens 425 includes one or more components and a stationary element, such as an inner covering or a nozzle of the turbine. Thus, the distance between a moving component and a stationary component can be tracked in order to identify distance changes and, correspondingly, events such as bucket 410 migrations, spallations, and the like.

Realtime data from the camera lens 425 can be transmitted by fiber optics 420 to the camera (not shown) and further to a processor to process camera data and determine possible anomalies of the components of the hot gas path. The anomalies can include migration, liberation, shrouding, and cracking of the one or more hot gas path components or other defects.

Figure 5:
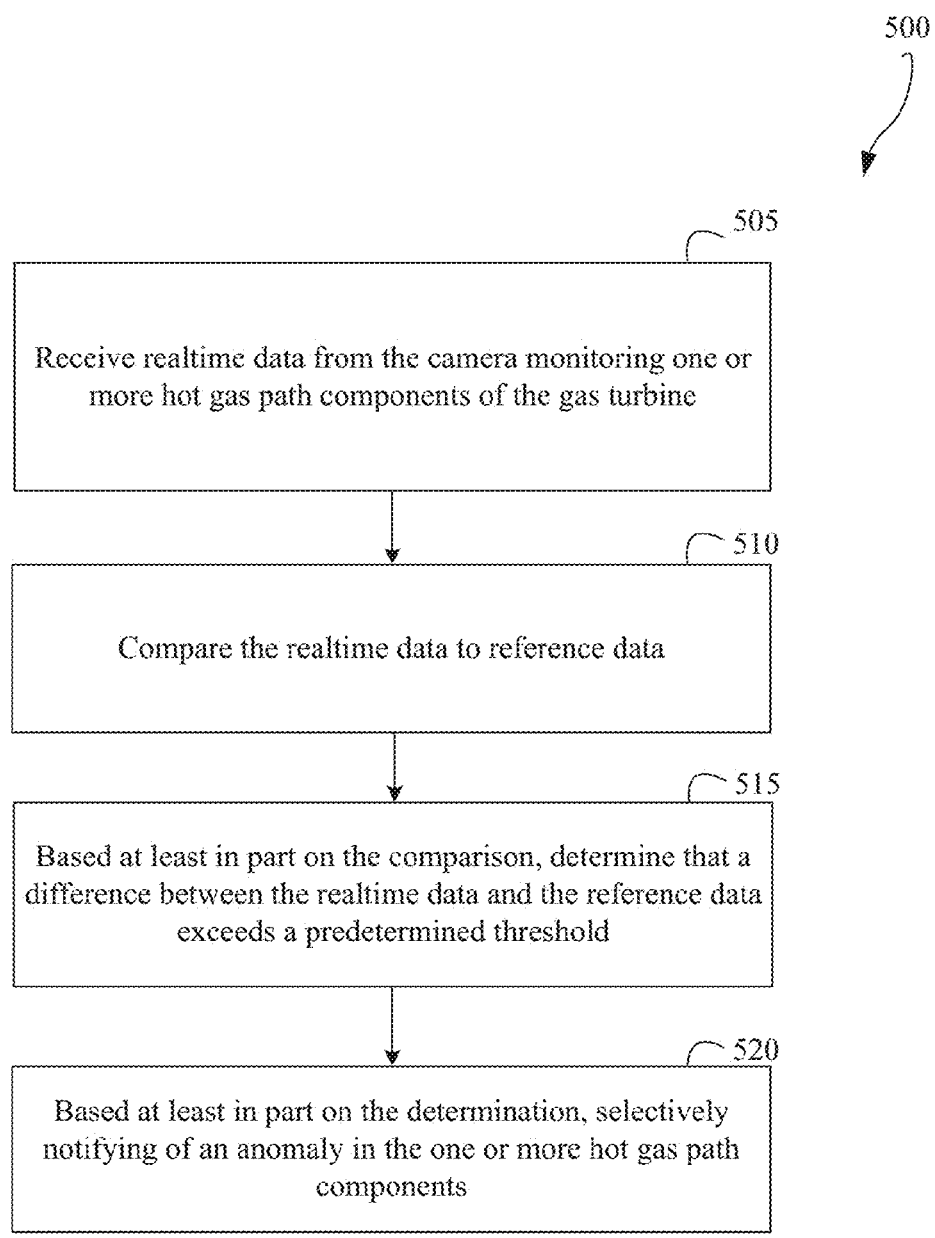
FIG. 5 is a flow chart illustrating an example method for on-line monitoring of hot gas path components of a gas turbine, in accordance with one or more example embodiments of the disclosure.

FIG. 5 depicts a process flow diagram illustrating an example method 500 for on-line monitoring of hot gas path components of a gas turbine, in accordance with an embodiment of the disclosure. The method 500 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the controller 800, which may reside in a user device or in a server.

Alternatively, the processing logic may reside, partially or in whole, at local or remote servers or other locations. It will be appreciated by one of ordinary skill in the art that instructions said to be executed by the controller 800 may, in fact, be retrieved and executed by one or more processors. The controller 800 may also include memory cards, servers, and/or computer discs. Although the controller 800 may be configured to perform one or more steps described herein, other control units may be utilized while still falling within the scope of various embodiments.

As shown in FIG. 5, the method 500 may commence in operation 505 with receiving realtime data from the camera monitoring one or more hot gas path components of the gas turbine. In some embodiments, the camera can be positioned on the outer covering of the gas turbine, while a camera lens is installed in the hot gas path to capture hot gas path components in operational conditions. In various embodiments, the camera can generate a constant video stream or it can run at a particular interval and take a predefined number of photos in a camera run.

In operation 510, the realtime data is compared to reference data associated with the components captured by the camera. The reference data can include historical data, data captured earlier, and/or standard measurements and deviations for the gas turbine.

Figure 6:
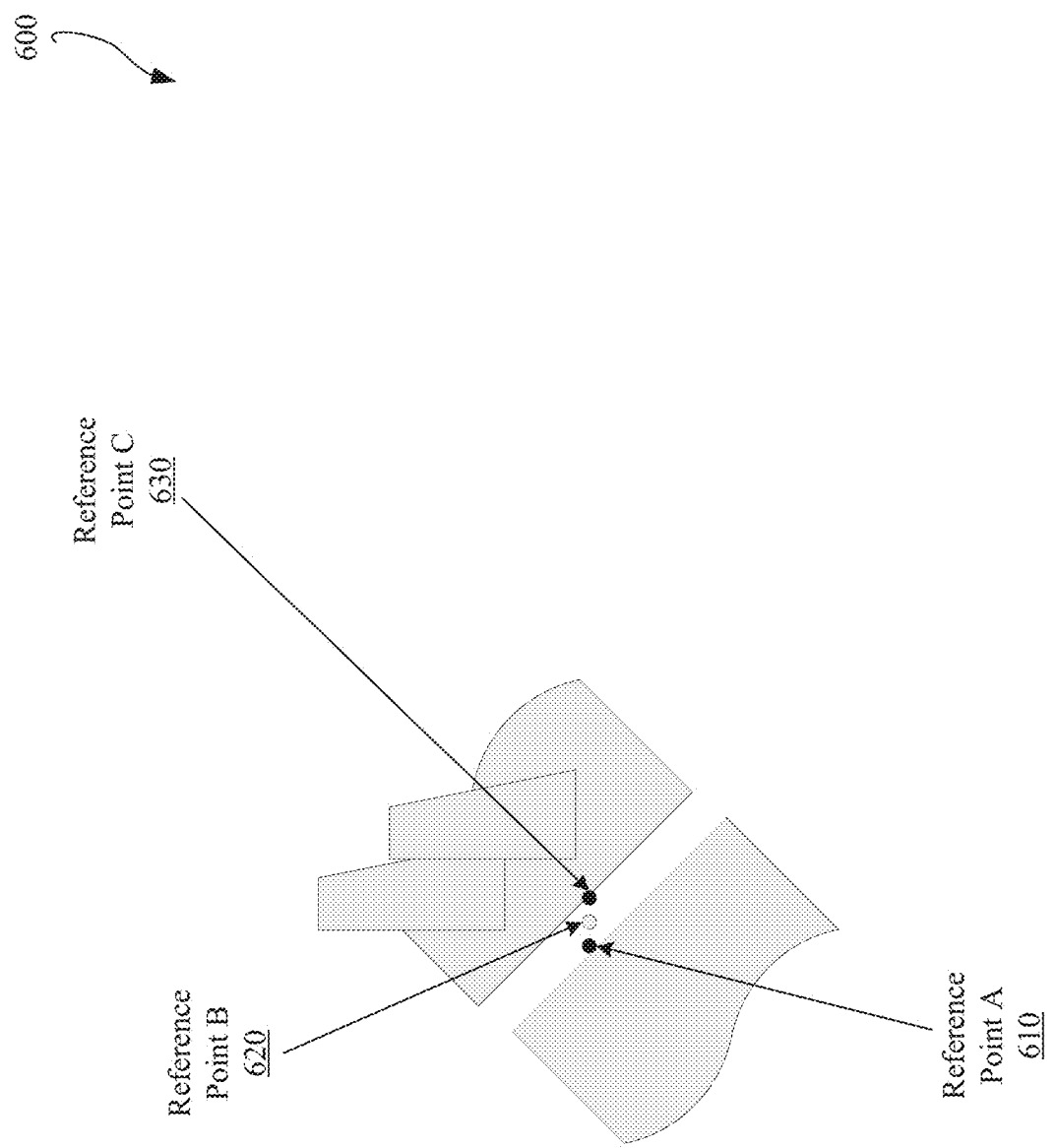
FIG. 6 illustrates an example method for detecting changes in positions of hot gas path components by measuring a distance between the one or more hot gas path components, in accordance with one or more example embodiments of the disclosure.

A comparison can be made using different methods and algorithms. Some of them include detecting reference coordinate changes, measuring the distance between parts, subtracting images, detecting relative geometrical changes, and so forth. Certain example methods are described in detail with reference to FIGS. 6-8 below.

By comparing the realtime and reference data, spatial, geometric, thermal, or other differences that could emerge in the position, shape, or structure of the components are detected.

In operation 515, the results of the comparison can be used to determine whether the difference between the realtime data and the reference data exceeds a predetermined threshold. The thresholds can be based on technical limits, design tolerances, or historical data. In some embodiments, results from previous comparisons and subsequent events can be used to adjust existing thresholds.

In some embodiments, the realtime data and comparison results can be transmitted to a remote processing center. The processing center can receive monitoring data from a plurality of gas turbines and notifications about further events, such as failures or defects detected during regular maintenance. Based on this information, the processing center generates recommendations on preventive measures and actions associated with monitoring findings. The recommendations can be transmitted to the system 200 and/or gas turbine controllers.

If it is determined in operation 515 that the difference between the realtime data and the reference data exceeds the threshold, such difference is considered an indication of an anomaly in the hot gas path components. For example, the difference can be indicative of a migration, liberation, shrouding, or cracking of the one or more hot gas path components, such as buckets, airfoils, rotor, and so forth. Based on the determination, the processor 210 notifies an operator of the anomaly in operation 520.

To notify an operator or another user of the gas turbine, an alarm can be generated. The alarm can be provided in a local control room and can be brought into the central system to inform experts. The experts can use the information associated with the alarm for estimations, forecasts, design limits, and so forth.

In some embodiments, the processor 210 and/or local and central system generate visualizations to display bucket migration trends and current values and images.

Additionally, the data associated with the difference as well as the realtime and reference data, specifics of the gas turbine (age, capacity, used fuels, and so forth), vibration alarms, rotor failure risk model information, and data from other turbines can be fused into a decision support engine. Based on the received data, the decision support engine can generate unit operation and maintenance recommendations which can be provided to the operator, engineers, and/or experts.

Furthermore, the system 200 can provide a signal to a turbine protective control system to trip the turbine or to take graceful shutdown to avoid further damage. In some embodiments, the signal can be based on operator commands or is subject to operator approval.

Below, various methods for comparing realtime data to reference data are described. One of the methods to detect changes in the position of hot gas path components is measuring a distance between one or more hot gas path components, as shown on an example thermographic map 600 shown in FIG. 6. The thermographic map 600 represents an image taken by a camera installed in the gas turbine. The image represents a stationary nozzle and a bucket platform with a gap between them. If the gap size decreases or increases, a bucket migration, spallation, or another anomaly can be suspected.

To track gap size changes, a reference point A 610 can be defined on a nozzle surface which is a stationary element. A reference point B 620 can be defined in the space where no signal is received. A reference point C 630 can be defined on a bucket surface. The reference points A, B, C (610, 620, 630) can be tracked over time, and distance between the reference points A, B, C (610, 620, 630) can be measured and compared with reference data. A change in the distance between the reference points A, B, C (610, 620, 630) can be an indication of a component shift either forward or aft. For example, such changes can indicate a bucket migration.

However, minor changes of the distance between the reference points A, B, C (610, 620, 630) can result from slight movements of the components and can be ignored. Therefore, some thresholds can be associated with the changes in the measured distance between the reference points A, B, C (610, 620, 630). The thresholds can be defined based on historical data, design tolerances, and so forth. The changes within the thresholds can be ignored, but when the thresholds are exceeded, an alarm can be generated and provided to the operator of the turbine.

Figure 7:
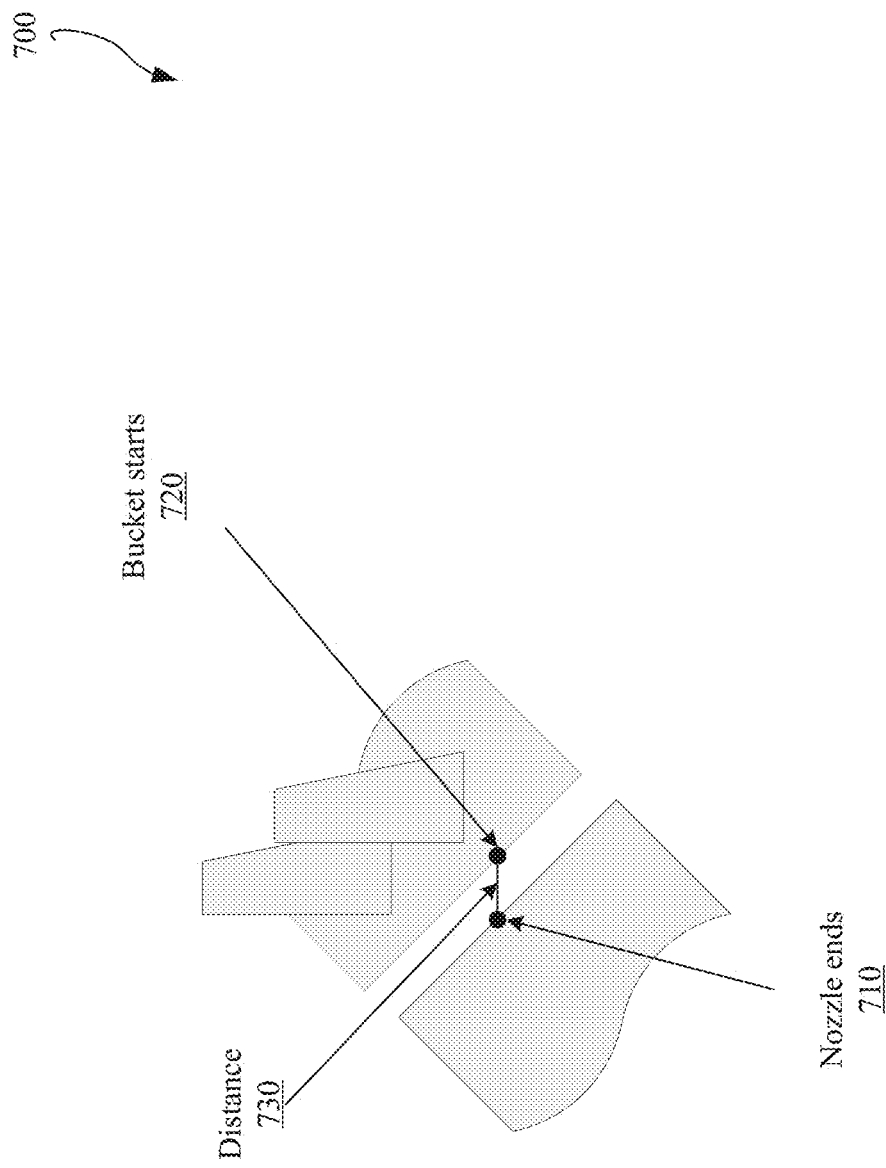
FIG. 7 illustrates an example method for detecting changes in positions of hot gas path components by counting pixels between the one or more hot gas path components, in accordance with one or more example embodiments of the disclosure.

FIG. 7 illustrates another method to detect changes in the position of hot gas path components based on counting pixels between the one or more hot gas path components on an example thermographic map 700. The camera can capture at least two components of the hot gas path (for example, a bucket and a nozzle). The distance between the components should remain substantially constant, and changes in the distance can indicate an anomaly in the position of the components. In some embodiments, the images from the camera can be processed or mapped to measure the gap between the components.

As shown, a distance 730 between the point where a nozzle ends 710 and the point where a bucket starts 720 can be measured. The distance 730 can represent a pixel row. The pixels in the row can be counted and compared to a reference number of pixels between the components. If the distance increases or decreases by more than a predefined threshold, an alarm can be generated and/or other actions taken.

According to a further method for detecting changes in the positions of hot gas path components, images of the same hot gas path components are subtracted. Infrared or visual images of the hot gas path components can be compared by means of image subtraction. A reference image of a specific hot gas path component or components and a current image of the same component or components can be subtracted from each other. That is, digital numeric values of the images are subtracted to detect changes between the reference image and the current image.

The results of the subtraction are highlighted changes. Based on the changes, anomalies in the components captured by the current image can be detected. The anomalies can include, for example, a spallation, a shift in a bucket direction, and so forth.

Yet another method for detecting changes in the position of hot gas path components is based on comparing 3D images of adjacent hot gas path components, in accordance with an embodiment of the disclosure.

Thermal images, such as a reference image and a current image, generated by the camera of the system 200 can be mapped on preexisting 3D models of the hot gas path components of the gas turbine. The mapping can result in the creation of 3D images of the hot gas path components. Using the 3D images and tracking bucket to bucket variation can help in identifying high risk parts even if the view is limited and the visual images are of poor quality. Identifying high risk parts can allow early detection of defects in the hot gas path components, such as buckets, airfoils, blades, nozzles, rotors, and so forth. The early detection can prevent major defects, failures and gas turbine downtime, and can save associated costs.

The above described methods for changes detection can be used individually or in combination with other methods to improve the accuracy of changes detection.

Figure 8:
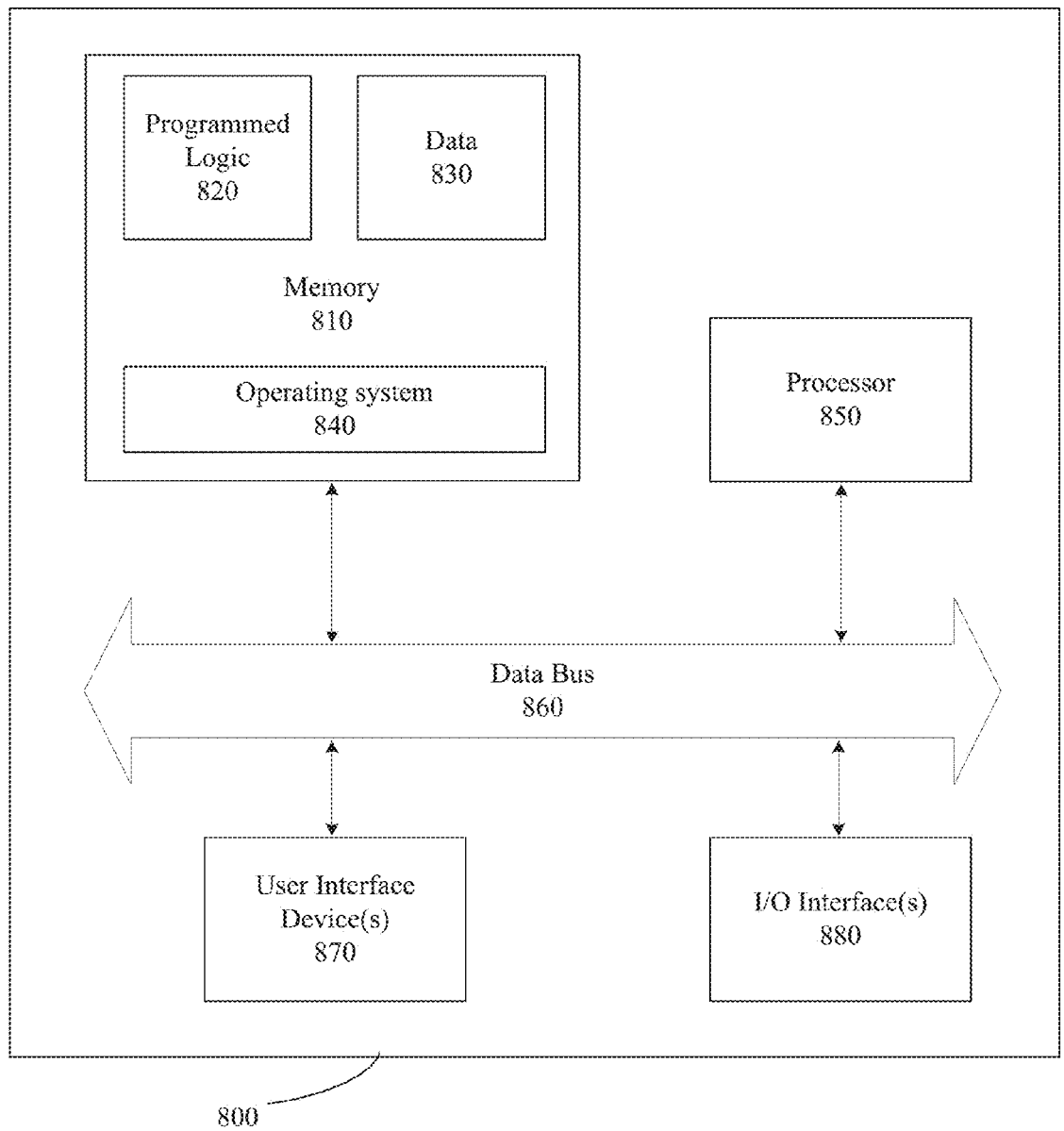
FIG. 8 is a block diagram illustrating an example controller for controlling a gas turbine, in accordance with one or more example embodiments of the disclosure.

FIG. 8 depicts a block diagram illustrating an example controller 800 for controlling a gas turbine, in accordance with an embodiment of the disclosure. More specifically, the elements of the controller 800 may be used to receive realtime data from the camera monitoring the one or more hot gas path components of the gas turbine; compare the realtime data to reference data, and based at least in part on the comparison, determine that a difference between the realtime data and the reference data exceeds a predetermined threshold; and based at least in part on the determination, selectively notify an operator of an anomaly in the one or more hot gas path components. The controller 800 may include a memory 810 that stores programmed logic 820 (e.g., software) and may store data 830, such as operational data associated with the gas turbine, the set of constants, and the like. The memory 810 also may include an operating system 840.

A processor 850 may utilize the operating system 840 to execute the programmed logic 820, and in doing so, may also utilize the data 830. A data bus 860 may provide communication between the memory 810 and the processor 850. Users may interface with the controller 800 via at least one user interface device 870, such as a keyboard, mouse, control panel, or any other devices capable of communicating data to and from the controller 800. The controller 800 may be in communication with the gas turbine and a camera via an input/output (I/O) interface 880.

Additionally, it should be appreciated that other external devices or multiple other gas turbines may be in communication with the controller 800 via the I/O interface 880. In the illustrated embodiment, the controller 800 may be located remotely with respect to the gas turbine; however, it may be co-located or even integrated with the gas turbine. Further, the controller 800 and the programmed logic 820 implemented thereby may include software, hardware, firmware, or any combination thereof. It should also be appreciated that multiple controllers 800 may be used, whereby different features described herein may be executed on one or more different controllers 800.

Accordingly, certain embodiments described herein can provide data for on-line monitoring of hot gas path components of a gas turbine during turbine operation for early identification of anomalies associated with the hot gas path components. The disclosed systems and methods allow preventing major damage to the turbine components and may decrease turbine downtime.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method for on-line monitoring of hot gas path components of a gas turbine, the method comprising:
   receiving, by a processor, realtime data from a camera monitoring one or more hot gas path components of the gas turbine while the gas turbine is in operation, wherein the camera monitors the one or more hot gas path components in relation to one or more stationary components of the gas turbine to detect changes in a proximity between the one or more hot gas path components and the one or more stationary components;
   comparing, by the processor, the realtime data to reference data, wherein the realtime data comprises changes in the proximity between the one or more hot gas path components and the one or more stationary components;
   based at least in part on the comparison, determining, by the processor, that a difference between the realtime data and the reference data exceeds a predetermined threshold; and
   based at least in part on the determination, selectively notifying of an anomaly in the one or more hot gas path components.

2. The method of claim 1, wherein the receiving the realtime data comprises receiving a thermographic map.

3. The method of claim 2, wherein the comparing comprises measuring a distance between the one or more hot gas path components on the thermographic map and comparing the measured distance to a reference distance between the one or more hot gas path components.

4. The method of claim 2, wherein the comparing comprises counting pixels between the one or more hot gas path components on the thermographic map and comparing the counted pixels to a reference number of pixels between the one or more hot gas path components.

5. The method of claim 1, wherein the comparing comprises subtracting an image associated with the one or more hot gas path components from a reference image associated with the one or more hot gas path components.

6. The method of claim 1, wherein the comparing comprises comparing 3D images of adjacent one or more hot gas path components, the 3D images being created by mapping images generated by the camera onto preexisting 3D models.

7. The method of claim 1, wherein the notifying comprises one or more of the following: issuing an alert to operators of the gas turbine, providing a maintenance advisory to the operators of the gas turbine, issuing a signal to a protective system associated with the gas turbine, providing operation recommendation to the operators of the gas turbine, and providing an visualization of abnormality trends to the operators of the gas turbine.

8. The method of claim 1, further comprising performing a shutdown of the gas turbine based at least in part on the determination.

9. The method of claim 1, further comprising storing the realtime data to a database to be used as historical data at a later time.

10. The method of claim 1, wherein the determining that the difference between the realtime data and the reference data exceeds the predetermined threshold is indicative of one or more of migration, liberation, shrouding, and cracking of the one or more hot gas path components.

11. A system for on-line monitoring of hot gas path components of a gas turbine, the system comprising:
  a camera operable to monitor one or more hot gas path components of the gas turbine; and
  a processor communicatively coupled to the camera and operable to:
    receive realtime data from the camera monitoring the one or more hot gas path components of the gas turbine while the gas turbine is in operation, wherein the camera monitors the one or more hot gas path components in relation to one or more stationary components of the gas turbine to detect changes in a proximity between the one or more hot gas path components and the one or more stationary components;
    compare the realtime data to reference data, wherein the realtime data comprises changes in the proximity between the one or more hot gas path components and the one or more stationary components;
    based at least in part on the comparison, determine that a difference between the realtime data and the reference data exceeds a predetermined threshold; and
    based at least in part on the determination, selectively notify of an anomaly in the one or more hot gas path components.

12. The system of claim 11, wherein the realtime data comprises at least one image.

13. The system of claim 11, wherein the camera comprises a video camera.

14. The system of claim 11, wherein the anomaly in the one or more hot gas path components comprises one or more of a migration of a turbine airfoil, a migration of a turbine bucket, and a rotor cracking.

15. The system of claim 11, wherein the camera comprises a thermographic camera.

16. The system of claim 15, wherein the reference data comprises reference temperature values associated with the one or more hot gas path components and the realtime data comprises realtime temperature values associated with the one or more hot gas path components.

17. The system of claim 11, wherein the reference data comprises reference pixel values associated with the one or more hot gas path components and the realtime data comprises current pixel values associated with the one or more hot gas path components.

18. The system of claim 11, wherein the reference data comprises a reference image associated with the one or more hot gas path components and the realtime data comprises a current image associated with the one or more hot gas path components.

19. The system of claim 11, wherein the one or more hot gas path components comprise one or more of a bucket, a nozzle, and a rotor.

20. A system comprising:
  a gas turbine including a plurality of hot gas path components;
  an infrared (IR) camera operable to monitor the plurality of hot gas path components; and
  a processor communicatively coupled to the camera and operable to:
    receive realtime thermal images from the IR camera monitoring the plurality of hot gas path components of the gas turbine while the gas turbine is in operation, wherein the camera monitors the one or more hot gas path components in relation to one or more stationary components of the gas turbine to detect changes in a proximity between the one or more hot gas path components and the one or more stationary components;
    compare the realtime thermal images to reference thermal images, wherein the realtime thermal images comprise changes in the proximity between the one or more hot gas path components and the one or more stationary components;
    based at least in part on the comparison, determine that a difference between the realtime thermal images and the reference thermal images exceeds a predetermined threshold; and
    based at least in part on the determination, selectively notify of an anomaly in the plurality of hot gas path components.

* * * * *